July 8, 1958
H. QUERENGÄSSER ET AL
2,842,608
FLAT-TYPE ELECTROLYTIC DRY CELL
FOR USE IN PRIMARY BATTERIES
Filed April 28, 1953

Inventors
Hugo Querengässer
Wilhelm Wild,
Franz Bronstert,
Johann Sindel and
Friedrich Hentschel
by Karl Michaelis, atty.

United States Patent Office 2,842,608
Patented July 8, 1958

2,842,608

FLAT-TYPE ELECTROLYTIC DRY CELL FOR USE IN PRIMARY BATTERIES

Hugo Querengässer, Knappsack, near Cologne, Wilhelm Wild, Ellwangen, Jagst, Franz Bronstert, Frankfurt am Main, Johann Sindel, Ellwangen, Jagst, and Friedrich Hentschel, Iserlohn, Germany, assignors to Pertrix-Union G. m. b. H., Frankfurt am Main, Germany, a limited liability company of Germany Application April 28, 1953, Serial No. 351,688

Claims priority, application Germany May 12, 1952

1 Claim. (Cl. 136—111)

This invention relates to dry primary batteries and more especially to a dry cell particularly adapted for use in the so-called staple batteries.

In batteries of this type, difficulties arise in the electric insulation of the single elements from each other and it is particularly difficult to altogether avoid the formation of current bridges or electrical leakage paths which might be formed by the liquid electrolyte escaping from the cells.

It has been suggested to provide the single cells of such staple batteries with a border, for instance made of paper or of an elastic material such as soft rubber.

It has also been suggested to arrange each single cell in a cup open on top and to arrange these cups with their conically formed side walls in nested superposition.

The first known method mentioned above is rather cumbersome and does not make it possible to produce such cells and batteries automatically in a continuous run.

The second known construction possesses the drawback that the electrolyte liquid can escape across the upper edge of the cup and then cause a leakage circuit to be formed with the adjoining cell.

All of these drawbacks are avoided, according to the present invention, by enclosing the depolarizer, the electrolyte carrier and the zinc plate with its conductive cover in a bipartite box formed of pliable or rigid material, preferably a synthetic material.

According to this invention, the two enclosure members or parts of the box are formed, each of them, with a transverse wall portion having an opening through which the members which form the conductive connections with the adjoining cells can project, for instance in the form of a boss on the depolarizer.

In the further development of this invention, one part of the box may consist of a soft material, for instance polyethylene, the other part of rigid material, for instance polystyrol. This combination offers the advantage that the edge portion of the soft and elastic part, when forced together with the other part, thus seals the gap between the two.

As far as wall thickness, elasticity and packing conditions are concerned, the invention offers the advantage that the boxes can be produced by die drawing and in this case we prefer to make both parts of the boxes from a soft and elastic resilient material, for instance polyvinylchloride.

We are thus enabled to produce at very low cost boxes with uniform minimal wall thickness and high elasticity and mechanical resistance.

By the same combination the elastic properties of the dry cell are improved. The elastic pressure exerted upon the electrodes of each individual cell lowers its internal resistance and thereby increases its output voltage under load. Additionally, the space required for the cells is reduced by decreasing the wall thickness according to this invention and in small batteries, for instance for hearing aids, the space saving may amount to 5–10 percent.

By completely sealing each individual cell against the adjacent cells, internal short circuits of the staple batteries formed of such cells are avoided altogether. The elasticity of the boxes produced according to this invention and the resulting internal pressure on each individual cell are so high that no additional wrappings are needed for the complete battery. All that is needed, is to provide such a battery, formed of individual dry cells according to this invention, with an insulating coatings, preferably of synthetic material.

When making boxes for these cells from synthetic material, difficulties may arise inasmuch as the side walls of the cells are materially less than 10 millimeters in height. In consequence thereof, in boxes with such low side walls produced by die drawing, when they are heated somewhat, for instance by the heat of a hand, the angle enclosed between the side wall and the bottom, which at first is 90°, will increase and the boxes will then undergo a change of form and their side walls will project or bulge outwardly. These drawbacks are avoided according to the drawing process used in accordance with this invention, by heating the foliae of synthetic material, before they are subjected to drawing—they are heated to a temperature of the order of 120° C. in the drawing tool, whereupon the hot drawn part is forced into a cold matrix and the die pressing the drawn part into the matrix is left in contact with the drawn part until it has cooled down.

We have also found it particularly advantageous to heat the fold sections, when they have formed by drawing, by means of hot air or some other heating medium right in the drawing tool, the heat being applied for instance 5 seconds up to 120° C., the die being left here also in the drawn part until it has cooled down.

Obviously this process can be carried out on a conveyor belt.

The new process according to this invention offers the advantage that even if the cup or other box part is later on heated, the low side wall will remain in position normal to the bottom surface. Tests made in this respect have shown that the parts of the boxes produced in accordance with our process will not suffer any change of form even when dipped into paraffin heated to 80° C.

In the drawings accompanying this specification and forming part thereof, an embodiment of a dry cell according to this invention is shown diagrammatically by way of example.

Figure 1:
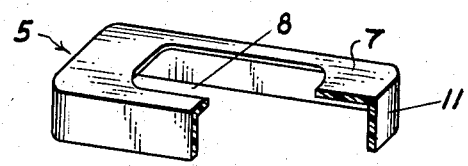
Figure 1 is a perspective view of an upper cover or enclosure member, partially shown in section to illustrate details of construction.
Figure 2:
Figure 2 is a perspective view similar to Fig. 1, showing a lower enclosure member.

As shown in the drawing, a depolarizing member 1 is engaged by an electrolyte carrier 2. The electrolyte carrier 2 also engages a zinc anode 3 which is disposed below the depolarizing member 1. There are two cooperating unitary enclosure members designated generally as 5 and 6. The upper enclosure member 5 has a flat transverse or end wall portion 7 which is centrally apertured at 8. The lower enclosure member similarly comprises a flat end wall 9 which is centrally apertured at 10. Each of the end wall portions 7 and 9 is peripherally surrounded by an integrally formed smooth and continuous lateral wall portion 11 and 12, respectively, which extends substantially perpendicularly away from its associated end wall portion.

Figure 3:
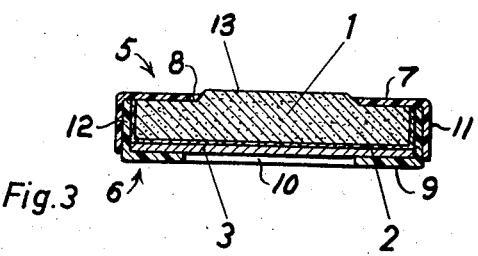
Figure 3 is a longitudinal sectional view in elevation showing an assembled dry cell.

After assembly, the lateral wall portion 11 of the upper enclosure member 5 substantially completely and coextensively overlies the lateral wall portion 12 of the lower enclosure member 6, as shown in Fig. 3. The cooperating enclosure members 5 and 6 thus define an enclosed space therebetween which is accessible through the central apertures 8 and 10 of the end wall portions 7 and 9, respectively.

The depolarizing member 1 has a boss 13 formed thereon which protrudes exteriorly beyond the end wall 7 of the upper enclosure member 5 through the central aperture 8. The zinc anode 3 is disposed in the enclosed space for engagement by the boss 13 of an adjacent cell, if any, (not shown) which would be located immediately below the single cell shown in Fig. 3, such boss extending through the aperture 10 in lower enclosure member 6 into engagement with the under side of the zinc anode 3. In this manner a plurality of cells in accordance with Fig. 3 may conveniently be assembled by stacking to form a multi-cell dry battery.

For assembly of the individual cell, the lateral wall portion 12 of the lower enclosure member 6 is initially slidable within the lateral wall portion 11 of the upper enclosure member 5. When the enclosure members 5 and 6 are formed of materials having different moduli of elasticity, the more resilient of the two lateral wall portions 11 and 12 yieldingly presses, when assembled as shown in Fig. 3, in sealing engagement against the other lateral wall portion for sealing the enclosed space within enclosure members 5 and 6 against leakage of electrolyte from the electrolyte carrier 2 therefrom.

Many changes may be made in the form and material of the parts hereabove described and shown in the drawings without departing from the invention or sacrificing the advantages thereof.

We claim:

A primary cell for dry batteries, comprising two cooperating unitary enclosure members each formed of partially rigid and resilient electrically insulative moisture impermeable material and each comprising a centrally apertured flat end wall portion peripherally surrounded by an integrally formed smooth and continuous lateral wall portion extending substantially perpendicularly away from said end wall portion, said enclosure members being formed of materials of different moduli of elasticity, the lateral wall portion of one of said enclosure members substantially completely and coextensively overlying the lateral wall portion of the other enclosure member to define an enclosed space between said members which is accessible through the central apertures of said end wall portions; a depolarizing member disposed in said space, said depolarizing member having a boss formed thereon which protrudes exteriorly beyond the end wall of one of said enclosure members through one of said central apertures; a zinc anode disposed in said space for engagement by the boss of an adjacent cell, if any, through the other of said apertures; and electrolyte carrying means disposed in engagement both with said depolarizing member and with said anode, said lateral wall portions of said enclosure members being initially slidable one within the other for assembly of said cell with the more resilient of said lateral wall portions yieldingly pressing in sealing engagement against the other for sealing said enclosed space against leakage of said electrolyte therefrom.

References Cited in the file of this patent

UNITED STATES PATENTS

| | | |
|---|---|---|
| 2,444,420 | Borkland | July 6, 1948 |
| 2,462,940 | Bowes | Mar. 1, 1949 |
| 2,480,941 | Lewis et al. | Sept. 6, 1949 |
| 2,519,527 | Wilkinson | Aug. 22, 1950 |
| 2,580,415 | Ellis | Jan. 1, 1952 |
| 2,626,295 | MacFarland | Jan. 20, 1953 |
| 2,645,676 | Emeriat | July 14, 1953 |
| 2,654,794 | Zaugg | Oct. 6, 1953 |
| 2,677,716 | MacFarland | May 4, 1954 |

FOREIGN PATENTS

| | | |
|---|---|---|
| 235,835 | Switzerland | May 1, 1945 |